United States Patent [19]
Wheeler

[11] Patent Number: 5,692,766
[45] Date of Patent: Dec. 2, 1997

[54] BABY TRANSPORTING VEHICLE WITH SAFETY SIDE HANDLE

[76] Inventor: Susan E. Wheeler, 2733 W. Farwell, Chicago, Ill. 60645

[21] Appl. No.: 249,529

[22] Filed: May 26, 1994

[51] Int. Cl.$^6$ .................................................. B62B 7/06
[52] U.S. Cl. ........................ 280/642; 280/30; 280/643; 280/648; 280/650; 280/47.38
[58] Field of Search ........................ 280/30, 642, 643, 280/648, 649, 650, 655.1, 47.38, 33.992; 297/183.4, 183.6, 144, 146

[56] References Cited

U.S. PATENT DOCUMENTS

| | | | |
|---|---|---|---|
| 71,970 | 12/1867 | Brown | 297/146 |
| 2,812,949 | 6/1957 | Munro | 280/643 |
| 2,872,203 | 2/1959 | Hedstrom | 280/643 |
| 3,079,162 | 2/1963 | Michels | 280/30 |
| 3,411,799 | 11/1968 | Felsher | 280/649 |
| 3,420,571 | 1/1969 | Moore | 297/119 |
| 4,165,127 | 8/1979 | Vago | 297/183.6 |
| 4,564,212 | 1/1986 | Orlandino et al. | 280/649 |
| 5,029,891 | 7/1991 | Jacobs | 280/650 |
| 5,213,360 | 5/1993 | Lin | 280/643 |
| 5,388,853 | 2/1995 | Lauro | 280/642 |

FOREIGN PATENT DOCUMENTS

| | | | |
|---|---|---|---|
| 514054 | 11/1992 | European Pat. Off. | 280/47.38 |
| 2350917 | 4/1975 | Germany | 280/643 |

Primary Examiner—Anne Marie Boehler
Assistant Examiner—Min Yu

[57] ABSTRACT

A vehicle for transporting a child (stroller, carriage or buggy) with a safety side handle pivotally connected to the vehicle frame. The pivot point for the side handle is located forward of the rear of the vehicle by a distance equal to at least about one-quarter of the front-to-back dimension of the vehicle. Better results are obtained if the distance mentioned is about one-third of the front-to-back dimension of the vehicle, and a distance of about one-half that dimension is preferred. The handle pivots from an inoperative position alongside the vehicle to a laterally extending, operative position, where it can be pushed to move the vehicle forward. The preferred form includes a collapsible tray table attached to the rear of the vehicle. The side handle may be attached indirectly to the vehicle frame through a pivotable attachment to the outer end of the side handle support frame that is in turn directly and pivotally attached to the vehicle frame. The side handle support frame can also support the tray table when the table is in use.

20 Claims, 3 Drawing Sheets

BABY TRANSPORTING VEHICLE WITH SAFETY SIDE HANDLE

FIELD OF THE INVENTION

This invention relates to a vehicle for transporting a baby, such as a baby stroller, carriage or buggy, that incorporates a safety side handle.

BACKGROUND OF THE INVENTION

Baby strollers have been in use for many decades. In every case known to applicant, these strollers have had two serious disadvantages. These disadvantages are also present with most baby carriages or baby buggies.

First, when the stroller is pushed by an adult or teenager walking behind it, the situation ahead is not always clearly visible to the person pushing the stroller. If the stroller is being pushed through a crowd of pedestrians, the front end of the stroller may be accidentally pushed against a person walking in front of the stroller, which may be serious if that person is a small child. Even more important, when the stroller is being pushed across a street, the person pushing the stroller may not see the passing automobile traffic clearly enough to avoid a dangerous accident, especially when there are automobiles turning the corner at the intersection through which the stroller is being pushed. Obstacles such as curbs and potholes can also be dangerous if they are not clearly visible to the person pushing the stroller.

Second, a person pushing a baby stroller from behind will not be able to see the child in the stroller clearly at all times. He or she may therefore not be aware of the situation if the child becomes ill or is otherwise in distress. Conversely, if the child can see the person pushing the stroller at all times, the child is more likely to feel secure. The blocking of one's view of the child in the stroller is especially serious when, as is very common, the stroller includes a canopy.

The safety side handle of this invention solves both these problems.

Two U.S. patents provide alternative handle means by which the user of certain equipment can push the equipment along, but the structure in both cases is totally different from the structure employed in applicant's invention, and the problems addressed in those patents are entirely different from the problems addressed by applicant's invention.

The patents in question are Mattson et al. U.S. Pat. No. 3,341,235 issued Sep. 12, 1967 and Vigot U.S. Pat. No. 3,503,276 issued Mar. 31, 1970. Neither patent is concerned with enabling the person using the equipment to walk anywhere in front of that person's customary position. In Vigot the alternative handle does extend laterally beyond the operating parts of the equipment, but not forward to any extent at all. The device of Mattson et al. does not even extend laterally beyond the side of the equipment, and merely provides an additional handle located only a few inches away from the conventional handle by which to grasp the long, rearwardly extending handle.

In neither case is there any concern about observing the work ahead of the user of the equipment. In Mattson et al., the only concern is the convenience of the operator of the trimmer-edger with which the extra handle is used. In Vigot the concern is to permit the operator who guides a cultivator or other soil working implement to walk on one side of the path of the equipment (on ground not yet worked) in order not to destroy the finely cultivated state in which the soil has been left by the implement as it has moved along.

SUMMARY OF THE INVENTION

The baby stroller, carriage or buggy of this invention avoids all the disadvantages mentioned above, through the use of a safety side handle that is extendable laterally from one side of the vehicle.

The side handle has a laterally extending, operative position that is fixed with respect to the stroller, carriage or buggy against a push applied to the side handle in the forward direction. This means that by grasping the side handle a person pushing the vehicle can guide it from a position alongside the vehicle rather than behind it. From this position, his or her view of the baby and the surrounding foot and automobile traffic is not blocked to any extent and is entirely clear.

The side handle is pivotally connected to the side of the vehicle, and foldable to the rear from its operative position extending laterally from one side of the vehicle, into an inoperative position closely adjacent the side of the stroller. This inoperative position extends alongside the vehicle and is preferably closely adjacent the side of the vehicle. The pivot point for the side handle is located forward of the rear of the vehicle by a distance that is suitably at least about one-quarter of the front-to-back dimension of the vehicle. Better results can be obtained if this distance is at least about one-third of the front-to-back dimension of the vehicle, and a distance of about one-half of the front-to-back dimension of the vehicle is preferred.

In a basic form of the invention, the safety side handle is directly attached at its inner end to the vehicle frame.

If desired, the side handle may be attached indirectly to the vehicle frame through a pivotal attachment to the outer end of a side handle support frame that is in turn directly and pivotally attached to the vehicle frame. This support frame may be adjustable in length, which permits the side handle to be positioned at any of several predetermined front-to-back locations alongside the stroller or other vehicle.

In a preferred embodiment, the side handle support frame is pivotally attached at its inner end to the most rearward portion of the side of the vehicle frame. This enables the side handle support frame to be swung forward against the side of the vehicle when the side handle is to be used in its laterally extended position, and at other times to be swung backward to extend behind the vehicle as a part of the support for the tray table to be described below. The side handle is pivotally mounted on the side handle support frame at the front of the frame, so that the side handle can be swung out to one side of the vehicle when the handle is in use, or can be folded back against or nested within the side handle support frame when the handle is not in use.

A baby stroller according to this invention is disclosed in the accompanying drawing in a form in which the entire stroller can be collapsed into a compact space. In this form, the folded-together side handle and side handle support frame are adapted to be swung around—together with any tray table (in collapsed condition) that is incorporated in the vehicle—into an out-of-the way or storage position behind the back support of the stroller.

A collapsible tray table formed of a flexible sheet is disclosed for the baby transporting vehicle of this invention. The tray table can be placed in its collapsed, inoperative condition behind the back of the vehicle, with the flexible sheet (which is attached at one end to the vehicle frame and at the other end to a crossbar supported on two legs) draped down to fold upon itself. The tray table has an extended, operative position in which the tray table support legs are held spaced from the back of the vehicle and the flexible sheet is pulled up from its lower, folded, inoperative condition into a relatively taut, generally horizontal position.

When the baby transporting vehicle is stopped and the tray table is moved into its operative position, a baby can be supported on the tray table while the baby's diaper or clothes are being changed. When the tray table is not being used, it can be collapsed again into its out-of-the way position behind the vehicle.

The disclosed safety side handle can also be used, with suitable modifications, with a baby carriage or baby buggy.

GENERAL DESCRIPTION OF THE DRAWING

The invention will now be described by reference to the accompanying drawing, in which.

DETAILED DESCRIPTION OF PREFERRED EMBODIMENT

The Figures of the drawing show various views of a preferred embodiment of a baby stroller according to this invention, which includes both a collapsible safety side handle and a collapsible tray table.

General Construction of Stroller Frame

Figures 1, 2, 3, 4:
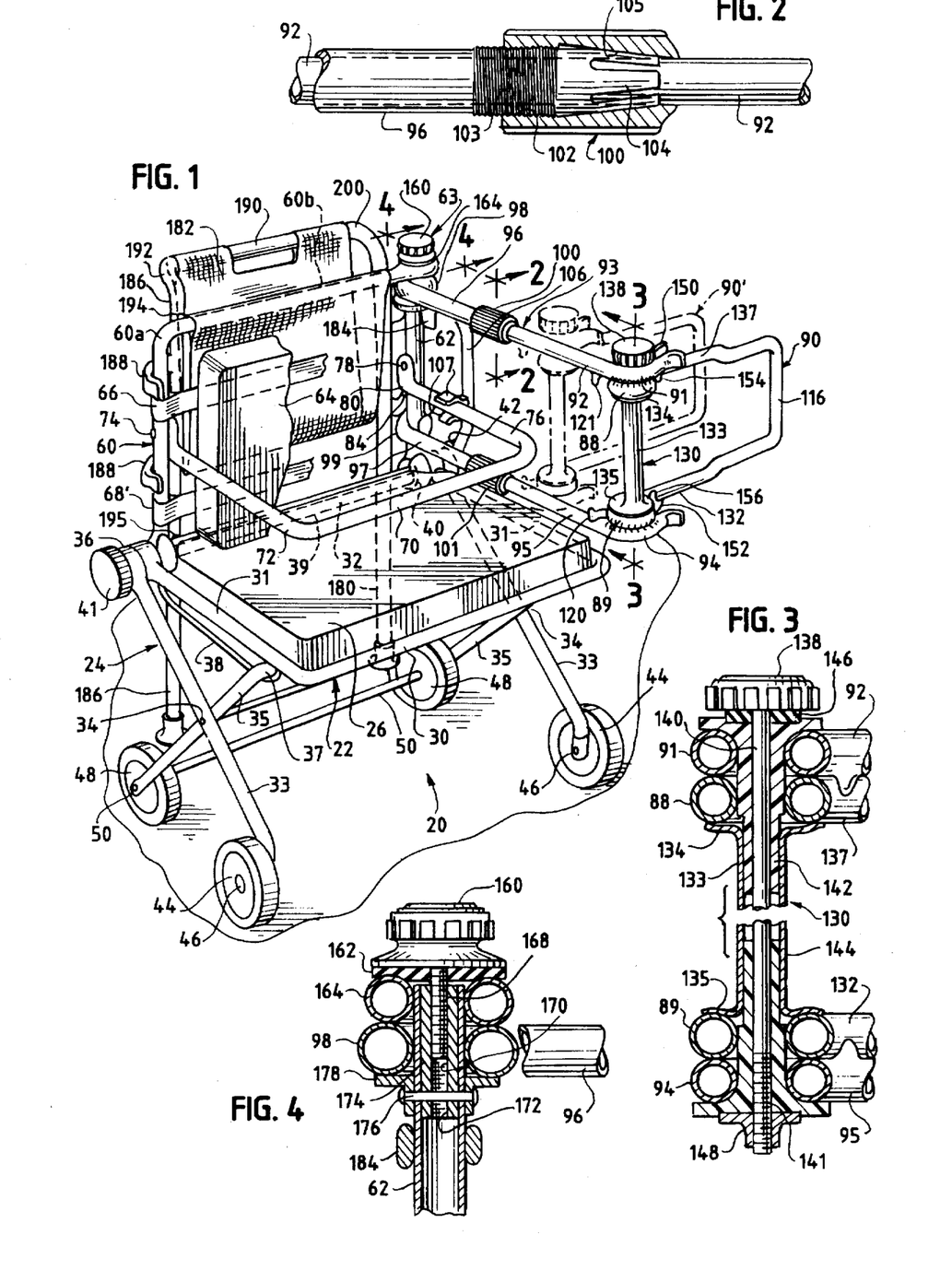
FIG. 1 is a three-quarters perspective view of one embodiment of the baby stroller of this invention (a) with the side handle shown in solid line in its forwardmost position and in dashed lines in an alternative location farther back along the side of the stroller, and (b) with the back cushion broken away to show the tray table in its collapsed condition behind the stroller.
FIG. 2 is an enlarged, fragmentary cross-sectional view taken along line 2—2 in FIG. 1 to show the mechanism by which the length of the side handle support frame can be adjusted as desired, in order to change the front-to-back location of the side handle with respect to the baby stroller.
FIG. 3 is an enlarged, fragmentary cross-sectional view taken along line 3—3 in FIG. 1 to show the pivot/clamp by which the laterally extending side handle can be positioned at a selected angle with respect to the side of the baby stroller in this embodiment.
FIG. 4 is an enlarged, fragmentary cross-sectional view taken along line 4—4 in FIG. 1 to show the mechanism by which the support frame for the side handle can be (a) locked in the position it occupies in FIG. 1, (b) unlocked and swung 180° counterclockwise to be locked in the position shown in FIG. 5 or (c) swung an additional 90° counterclockwise and locked in the position shown in FIG. 9, as desired.
Figures 5, 6, 7, 8:
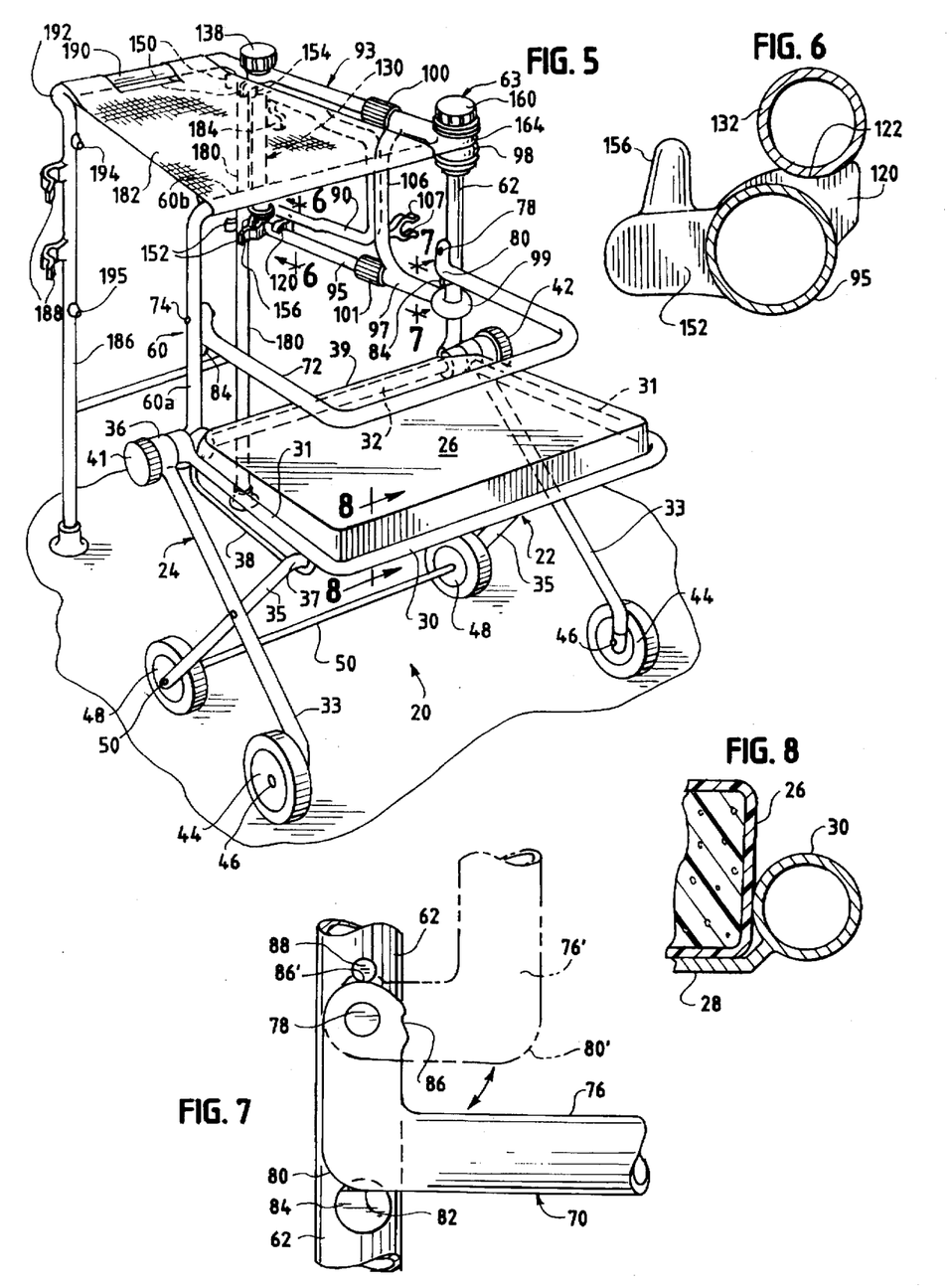
FIG. 5 is a three-quarters perspective view of the embodiment of this invention that is illustrated in FIG. 1, with the tray table in its extended, operative condition and the back support omitted altogether in order that the structure for holding the tray table in its extended position can be seen better.
FIG. 6 is an enlarged, fragmentary cross-sectional view taken along line 6—6 in FIG. 5, showing (a) on the right hand-side of the Figure, the catch mechanism by which the side handle is releasably secured to the side handle support frame when folded together with and nested within the frame, and (b) on the left-hand side of the Figure, the limiting stop, carried by one of the clamping fingers at the outer end of the side handle support frame, that helps to position the side handle in its operative position laterally outward from the stroller.
FIG. 7 is an enlarged, fragmentary side elevation showing the rear portion of the armrest/restraining bar in its operative position in solid lines, and in dashed lines the retracted position that this member occupies when the stroller is in its compact, folded condition.
FIG. 8 is an enlarged, fragmentary cross-sectional view taken along line 8—8 in FIG. 5 to show how the seat cushion is supported.

In FIG. 1, baby stroller 20 includes child support member 22 which is held in a generally horizontal position by vehicle frame 24 when the stroller is in use. Child support member 22 includes a generally horizontal seat 26 which, as best seen in FIG. 8, rests upon cross-wise support member 28 which is secured to "U"-shaped member 30.

The open side of U-shaped member 30 faces to the rear of the baby stroller. Rearwardly extending legs 31 of member 30 are pivotally supported, through their common axle 32 (referred to below as the upper frame axle) upon the upper ends of a pair of collapsible stroller legs 33. These collapsible legs 33 are hinged at hinge points 34 with a second pair of collapsible stroller legs 35.

Figures 9, 10, 11, 12:
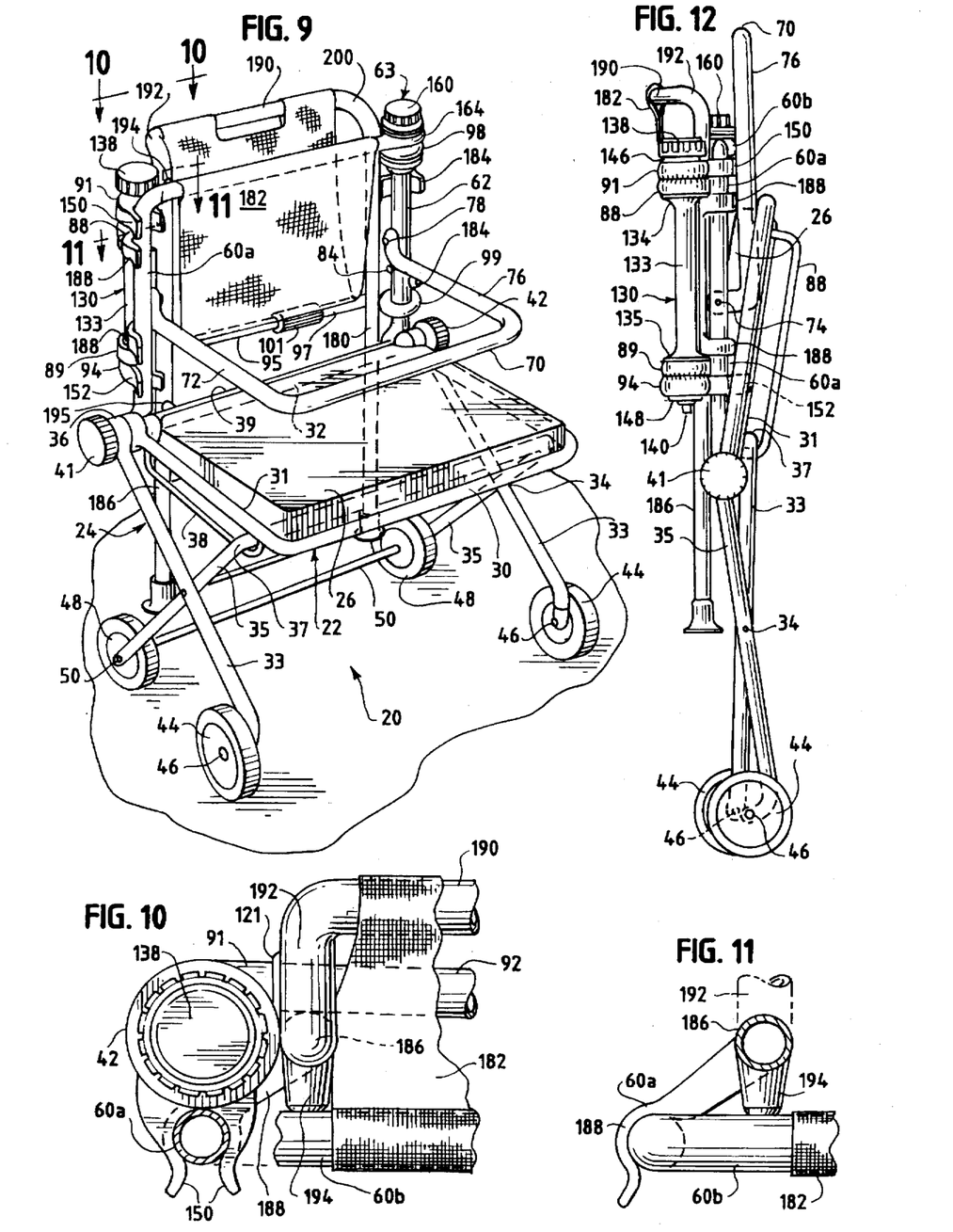
FIG. 9 is a three-quarters perspective view of the embodiment of FIG. 1 showing both the side handle and the tray table collapsed into their respective out-of-the-way positions behind the baby stroller.
FIG. 10 is an enlarged, fragmentary, partially sectioned view taken along line 10—10 in FIG. 9.
FIG. 11 is similarly enlarged fragmentary cross-sectional view taken along line 11—11 in FIG. 9.
FIG. 12 is a side view of the embodiment of FIGS. 1, 5 and 9 showing the stroller collapsed into its compact, folded condition.

Upper end 36 of each stroller leg 33 is pivotally connected to upper frame axle 32, which extends across the rear of the baby stroller. As best seen in FIG. 9, upper end 37 of each stroller leg 35 is slidably journaled in a generally horizontal channel, located just below "U"-shaped member 30, that is formed by guide wire 38. The two upper ends 37 of legs 35 are connected by crossbar 37a.

Axle 32 is positioned within tube 39, flanged at both ends 40, which is similar to the other tubing of which the vehicle frame is formed. When the baby stroller is in either its operative or its storage condition, knobs 41 and 42, at either end of axle 32, are used to tighten all the members within which axle 32 is journaled. When it is desired to move the stroller from one condition to the other, knobs 41 and 42 are loosened and then retightened.

A wheel 44 is rotatably attached through outwardly extending axle 46 to the bottom end of each leg 33. A wheel 48, located just inside each leg 35 at the bottom end of the leg, rotates about each end of lower frame axle 50.

Vehicle frame 22 is completed by inverted "L"-shaped member 60 (which includes vertical member 60a and horizontal member 60b), upright post member 62 and combination pivot/clamp 63 which (as best seen in FIG. 4) connects members 60 and 62. Together, members 60, 62 and 63 comprise an inverted "U"-shaped member that supports back cushion 64 through crosswise-extending straps 66 and 68.

Arm rest/restraining bar 70 is a rearwardly extending "U"-shaped member that helps keep the baby seated on seat cushion 26 of the stroller. One rearwardly extending leg 72 of the arm rest/restraining bar is pivotally connected at pivot point 74 to the vertical portion 60a of inverted "L"-shaped frame member 60. The other rearwardly extending member 76 is pivotally connected at pivot point 78 to upright frame member 62.

This latter connection is best seen in the enlarged, fragmentary view of FIG. 7. Rearwardly extending leg 76 terminates in elbow 80, which is shown in FIG. 7 in its operative position in solid lines and in its collapsed position 80' in dashed lines. As there illustrated, when arm rest/ restraining bar 70 is in its operative position, bottom surface 82 of elbow 80 is supported by post 84, which extends inward from upright frame member 62. In this position of member 70, notch 86 (in the outer end of the shorter arm of elbow 80) faces forward. When the rearwardly extending leg 76 is in its upper, inoperative position 76', it is releasably but firmly held there by the engagement of notch 86 with pin 88 carried by upright post member 62.

A similar arrangement of parts is located on the opposite side of the stroller. It should be noted that certain details of the construction shown in the enlarged view of FIG. 7 just discussed—such as notch 86, pin 88 and in some instances certain other details—are omitted for the sake of clarity from FIGS. 1, 5 and 9.

Side Handle and Side Handle Support Frame

FIG. 1 shows in solid lines safety side handle 90 in its fully open operative position extending laterally from the forward portion of one side of the baby stroller. In this position, the side handle is fixed with respect to the stroller against a push applied to the handle in the forward direction. This makes it possible for a person pushing the stroller to do so by grasping the side handle from a position alongside the stroller, from which position the child, the surrounding foot and automobile traffic and any upcoming obstacles such as curbs and potholes can be observed as the vehicle is pushed along.

Side handle 90 is pivotally attached at its inner end portion 88 to outer end portion 91 of upper member 92 of side handle support frame 93, and at inner end portion 89 to outer end portion 94 of lower member 95 of the support frame. Upper member 96 and lower member 97 of the side handle support frame are in turn pivotally attached at their respective inner ends 98 and 99 to upright post member 62 at the rear portion of the stroller frame.

Vertical stabilizer post 106 extends between upper support frame member 96 and corresponding lower support frame member 97. Stabilizer post 106 carries clamping fingers 107, which face inward toward the baby stroller when side handle support frame 93 is in its forwardly extending position as shown in FIG. 1. In this position of the side handle support frame, clamping fingers 107 releasably grasp rearwardly extending leg 76 of arm rest 70, to help hold the side handle support frame in this forward position.

In FIG. 1, side handle support frame 93 has been swung forward against the side of the stroller, and the side handle extends laterally outward in its fully open operative position. When side handle 90 is not in use, it can be folded back from this position against the side handle support frame. From there the folded-together side handle and side handle support frame can be swung into either of two positions that will be described below in connection with FIGS. 5 and 9.

Adjustable Length of Side Handle Support Frame

The side handle is also shown in FIG. 1 (in dashed lines) in another position 90' alongside the stroller. Here the side handle extends laterally in a position selected by the user to be not so far forward as the position that is shown in solid lines. With this embodiment, the desired position of the side handle can be selected by (1) moving upper side handle support frame member 92 farther into, or farther out of, its telescoped relationship with upper portion 96 of the side handle support frame, which has a larger diameter than does member 92, and (2) doing the same thing with corresponding lower support frame members 95 and 97. Once it has been selected by the user of the stroller, the overall length of the side handle support frame is fixed by use of upper clamp 100 and similar clamp 101 at the bottom of the support frame.

As seen in FIG. 2, the inner surface of cylindrical clamp 100 is threaded at one end 102. These threads 102 match threaded portion 103 near the outer end of side handle support frame member 96. At its extreme outer end, member 96 terminates in a set of tapered flexible fingers 104. The end of clamp 100 opposite threaded end 102 is inwardly tapered at 105 so that when outer clamp 100 is rotated clockwise with respect to support frame member 96, the interaction of threads 102 and 103 will cause inwardly tapered wall 104 of the clamp to move to the left in FIG. 2 and press flexible fingers 104 of side handle support frame member 96 firmly against support frame member 92. This action, together with a similar action by lower clamping means 101, will hold side handle support frame 93 in the desired forward position selected by the user of the stroller.

Any other suitable means for adjusting the length of the side handle support frame may be employed. In fact, if desired, the side handle support frame may be of a fixed length that will position the side handle carried by the support frame at a single desired front-to-back location.

Nesting of Side Handle Within Support Frame

When it is desired to fold side handle 90 back (from the position shown in solid lines in FIG. 1) against side handle support frame 93 because the side handle will not be used for a while, pivot/clamp 130 (described in more detail below) can be loosened and the side handle swung back 90° to move outer end 116 of the side handle back to a position adjacent vertical stabilizer leg 106 of the side handle support frame, where it is nested within the support frame. This adjacent positioning of vertical stabilizer leg 106 and outer end 116 of side handle 90 is shown in FIG. 5, after the side handle has been rotated 90° in the counterclockwise direction (as viewed from above the stroller) from its position shown in FIG. 1, and the side handle support frame and the side handle nested within it have then been swung around an additional 180° in the counterclockwise direction to extend directly back from the stroller.

When side handle 90 has been swung around 90° from its position shown in FIG. 1 to its nested position within support frame 93, but before the support frame has been swung 180° back to its position shown in FIG. 5, the side handle is confined to the inoperative position shown in FIG. 5 by a releasable engagement with notched holding member 120 carried by the side handle support frame. As best seen in FIG. 6 (which is an enlarged, fragmentary cross-sectional view taken along line 6—6 in FIG. 5), holding member 120 extends upward from lower support frame member 95. The top end of member 120 terminates in notch 122, which has a curvature complementary to the curvature of bottom member 132 of the side handle. A similar notched holding member 121 (best seen in FIGS. 1 and 10) is carried by upper support frame member 92.

By comparing FIGS. 1, 5 and 6, it will be seen that in FIG. 6 the first 90° pivoting of the side handle just discussed has been from a position extending to the left in the plane of the paper (where the side handle is in contact with limiting stop 156 described below) up out of the plane of the paper into a position perpendicular to that plane. Because the outside dimensions of the side handle are less than the inside dimensions of the side handle support frame, the side handle can nest within the support frame in this folded-together condition.

Pivot/Clamp for Side Handle

As already explained above, side handle support frame 93 is pivotally attached at its inner end to vertical post member 62 of vehicle frame 24. At its outer end, the support frame terminates in this embodiment in combination pivot/clamp 130, which is used for moving side handle 90 into any of its various possible positions and holding it there. Pivot/clamp 130 allows the side handle to be pivoted back into its nested position inside the side handle support frame, or forward into its laterally extending operative position for pushing the vehicle, or into any desired position in between. In any of these positions, the side handle may be locked in place by operation of the clamping feature of member 130 to be described in more detail below.

As seen in FIG. 1, pivot/clamp 130 includes, from bottom to top, outer end portion 94 of lower member 95 of support frame 93, inner end portion 89 of member 132 of side handle 90, tubular member 133 (with outwardly extending flanges 134 and 135 at the top and bottom ends, respectively), inner end portion 88 of member 137 of the side handle, outer end portion 91 of upper member 92 of support frame 93 and control knob 138. As seen in FIG. 3, shaft 140 is fixedly attached at its upper end to the bottom of control knob 138 and is threaded at its lower end portion 141. Shaft 140 is encased in an elongated gasket or liner, suitably made of metal or of a strong plastic, which is formed of pieces 142 and 144 positioned within tubular member 133. Washer 146 is positioned between knob 138 and upper insert piece 142.

When control knob 138 is loosened, side handle 90 can be pivoted, with respect to support frame 93, back from its position shown in FIG. 1 to its nested position shown in FIG. 5. If the person pushing the stroller desires, the side handle can be stopped at any point, by tightening control knob 138, and the operator of the vehicle can push against the side handle with the handle positioned at any desired angle with respect to the vehicle.

As best seen in FIG. 3, when control knob 138 is tightened, the knob presses down against washer 146 and outwardly extending flange 193 on insert 142, while nut 148 at the bottom of shaft 140 is pulled up against insert 144 through its threaded engagement with the shaft. This causes the top portion of insert or liner piece 142 to press tightly against end portion 91 of support frame member 92, which in turn presses against inner end portion 88 of upper member 137 of the side handle, which in turn is pressed tightly against flange 134 of tubular member 133. Similar pressures are applied at the bottom of shaft 140. The resulting frictional forces between the indicated parts of pivot/clamp 130 lock together inner end portion 88 of upper member 137 of the side handle and outer end portion 91 of the support frame, as well as inner end portion 89 of lower member 132 of the side handle and outer end portion 94 of the support frame.

The respective abutting exterior surfaces of the members that are pressed together as described to produce a clamping action may if desired be roughened or scored, or lightly serrated, grooved or corrugated, to increase the security of the clamping action.

Support frame 93 carries at its outer end two pairs of clamping fingers 150 and 152 (at top and bottom outer end portions 91 and 94, respectively, of the side handle support frame). As will be explained below, these clamping fingers can be used to engage one of the support legs of the tray table and hold the tray table in its extended, operative position as shown in FIG. 5. They can also be used to hold the tray table, side handle and side handle support frame in their out-of-the way positions behind the stroller as shown in FIG. 9 and described below.

Limiting knobs 154 and 156 are located on one finger of each pair of clamping fingers 150 and 152, respectively (in each case the leftmost finger in FIG. 1), in order to limit the forward pivoting of the side handle with respect to its support frame to a maximum of 90°. The limiting knobs are best seen in FIGS. 1, 5 and 6.

Pivot/Clamp For Support Frame

As seen from FIGS. 1 and 5, frame upright member 62 and its associated parts, which together comprise pivot/clamp 63, provide a similar action for support frame 93 as pivot/clamp 130 provides for the side handle.

Inner end portions 96 and 97 of support frame 93 pivot about upright 62 at 98 and 99, respectively. When control knob 160 is loosened, this permits the support frame to be swung back 180° from its position in FIG. 1 to the position it occupies in FIG. 5. Or, if it is desired, it permits the support frame to be swung an additional 90° into the position shown in FIG. 9.

When the support frame is to be held in either of the positions shown in FIGS. 5 and 9, the support frame can (as best seen in FIG. 4) be clamped in the desired position by tightening control knob 160. This result follows from the fact that shaft 168, which is attached to the bottom of the control knob, is threaded at its bottom end portion 170 and is engaged with the threaded interior 172 of cylindrical insert 174. Insert 174 is held in a fixed position within upright member 62 by pin 176. Pin 176 also holds flanged member 178 in a fixed position with respect to upright 62.

When control knob 160 is tightened, this presses the bottom of the control knob against washer 162, which in turn presses against end portion 164 of horizontal member 60b of inverted L-shaped frame member 60. Member 164 is thus pressed against inner end portion 98 of support frame member 96, which is pressed against fixedly positioned flange member 178. As a result, side handle support frame 93 is held fixed in any desired location until control knob 160 is once again loosened.

Tray Table

FIG. 5 shows the baby stroller of this invention with the tray table opened up for use as a platform for changing a baby's diapers or clothing.

As will be seen by a comparison of FIGS. 1 and 5, in the latter Figure pivot/clamp 130 has been loosened by turning control knob 138 and side handle 90 has been swung back into its nested position within support frame 93. Control knob 138 was then tightened. Next, control knob 160 was loosened and the folded-together side handle and support frame were swung approximately 180° back into a position in which pairs of clamping fingers 150 and 152 engage vertical support leg 180 of tray table 182.

As a result, the tray table was pulled up from its draped condition in FIG. 1 into a generally horizontal position where it can supply a surface for supporting a small baby. Control knob 160 of pivot/clamp vertical member 62 was then tightened. The tension exerted on tray table 182 can be varied by adjusting the length of support frame 93 (in the manner already explained above) through utilization of clamping members 100 and 101.

Storage of Tray Table, Side Handle and Support Frame When Not in Use

After it has been used, the tray table can be stored in an out-of-the way position behind the rear of the stroller. As will be seen from FIGS. 1 and 9, this can be either with or without the side handle and its support frame, depending on whether or not the side handle is to be used again soon.

In this stored position, tray table support leg 180 is secured to vehicle frame upright member 62 through pair of fingers 184 (the lower one of the pair being partially obscured in FIG. 5). At the same time, tray table support leg 186 is secured to upright portion 60a of L-shaped vehicle frame member 60 through pair of fingers 188.

FIG. 10 is a fragmentary, cross-sectional view of a portion of the stroller (from the upper left-hand part of FIG. 9). It shows both the tray table and the side handle with its support frame stored in their out-of-the way positions. This Figure shows, from top to bottom on the right-hand side of the Figure, portions of (1) handle 190 and the flexible sheet of tray table 182, (2) slanting portion 192 of the tray table handle, (3) upper member 92 of side handle support frame 93, (4) the top end portion of tray table support leg 186, (5) spacer knob 194 and (6) horizontal bar 60b of the vehicle frame. The first four of these members are in their respective out-of-the-way positions behind the baby stroller.

FIG. 10 also shows, from top to bottom on the left-hand side of the Figure, (1) outer end portion 91 of upper member 92 of support frame 93, (2) control knob 138 for pivot/clamp 130 for side handle 90 as shown in FIG. 1, (3) flange 143 at the upper end of insert piece 142, (4) a small portion of upper finger 188 mounted on tray table support leg 186, (5) locking fingers 150 at outer end portion 91 of upper member 92 of support frame 93 and (6) upright support member 60a of the vehicle frame, with which all the fingers 150 and 188 are engaged. A small part of notched holding member 120 that is carried by outer end portion 91 of the side handle support frame can also be seen in FIG. 10.

As indicated in FIGS. 9 and 10, outer members 92 and 95 of side handle support frame 93 are slanted somewhat to provide room for outer end portions 91 and 94 of the support frame as well as inner end portions 88 and 89 of side handle 90. (Only the first of the four last mentioned members is seen in FIG. 10.) To keep tray table crossbar 190 parallel to horizontal vehicle frame member 60b, the slant in outer members 92 and 95 of the side handle support frame just described is compensated for by a slightly larger radius of curvature in slanting portion 200 (best seen in FIGS. 1 and 9) than in slanting portion 192 of the tray table handle.

Upper spacing knob 194, mounted on tray table support leg 186, keeps the support leg snug against the inner surface of side handle support frame member 92. Lower spacing knob 195 keeps tray table support leg 186 properly spaced from outer axle member 71. Upper and lower spacing knobs 194, 195 can be best seen in FIG. 5, and are also indicated in FIGS. 1 and 9.

As will be seen from FIG. 1, if desired, tray table crossbar 190 in its out-of-the way position behind the stroller can be used as an alternative way to push the baby stroller in addition to pushing the stroller with side handle 90. When the side handle is not going to be used and is stored with the tray table in the out-of-the way storage position behind the vehicle frame, tray table crossbar 190 can be used as the sole means of pushing the stroller.

It should be noted that in FIG. 9 the side handle and most of the side handle support frame, which are located behind tray table 182, are omitted for clarity.

FIG. 11 shows the entire upper finger 188 by which (along with lower finger 188) the collapsed tray table 182 is releasably held as shown in FIGS. 9 and 10 against the vehicle frame of the stroller.

Collapsible Stroller

FIG. 12 is a side view of the embodiment of the stroller of this invention that is described above and illustrated in the other Figures. It shows the stroller collapsed into its compact, folded condition.

The various parts of the stroller are designated by the same numerals that have been used for the other Figures of the drawing.

As will be seen, in this collapsed condition the baby stroller can be easily transported and stored as needed.

Other Embodiments

The embodiment disclosed in this specification and the accompanying drawings is the best embodiment contemplated by applicant at the time of this application. It will be clear to those skilled in the art, in particular those familiar with the mechanical engineering principles involved in the design of baby strollers, carriages or buggies, that certain parts of this stroller can be simplified in design.

As one example, various hinged connections such as those in pivot/clamps 63 and 130 could be simplified by use of more compact hinged clamps. The locking fingers could be simplified by the use of spring clips of adequate strength. The fingers carried by the tray table support legs could be moved to the inner side of the two vertical uprights of the vehicle frame, which would make the fingers less exposed without impairing their function.

The side handle feature of this invention is, as has been explained, for the sake of the safety of the child in the vehicle being pushed. The tray table feature is for the convenience of the person taking care of the child. If only the safety feature is desired, the side handle can be directly mounted on the vehicle frame. The front-to-back positioning of the side handle need not be adjustable (as it is with the embodiment disclosed in this specification), so long as (1) when the side handle is in use it is positioned in the indicated space adjacent the midportion or forward portion of the vehicle, (2) the laterally extended, operative position of the side handle is fixed, with respect to the vehicle, against a push in the forward direction and (3) when it is not in use, the side handle can be pivoted back to a position adjacent the side of the vehicle.

While this invention has been described in connection with the best mode presently contemplated by the inventor for carrying out her invention, the preferred embodiment described and shown is for purposes of illustration only, and is not to be construed as constituting any limitation of the invention. Modifications will be obvious to those skilled in the art, and all modifications that do not depart from the spirit of the invention are intended to be included within the scope of the appended claims.

What I claim is:

1. A wheeled vehicle for transporting a child comprising:
   (a) a child support member to hold the child;
   (b) a vehicle frame supporting the child support member;
   (c) a plurality of wheels pivotally attached to the bottom portion of said vehicle frame for supporting the wheeled vehicle on a surface over which the wheeled vehicle is to move; and
   (d) a side handle pivotally connected to the vehicle frame about a generally vertical axis located at a pivot point forward of the rear of the wheeled vehicle by a distance equal to at least about one-quarter of the distance from the back to the front of the wheeled vehicle, said side handle being pivotable about said generally vertical axis from an inoperative position adjacent one side of the vehicle frame to a fixed, operative position generally transverse to, and extending laterally out from, said one side of said vehicle frame to permit a person to move the wheeled vehicle along the surface by pushing said side handle from a position alongside of the wheeled vehicle from where a child in the wheeled vehicle and surrounding traffic and obstacles can be observed.

2. The wheeled vehicle of claim 1 in which the pivot point for the side handle is located forward of the rear of the vehicle by a distance equal to at least about one-third of the distance from the back to the front of the wheeled vehicle.

3. The wheeled vehicle of claim 1 in which the pivot point for the side handle is located forward of the rear of the vehicle by a distance equal to at least about one-half of the distance from the back to the front of the wheeled vehicle.

4. The wheeled vehicle of claim 1 in which the side handle is pivotable about said vertical axis between said inoperative position adjacent said one side of said vehicle frame through an angle of up to 90° to a selected operative position, said wheeled vehicle including clamping means for holding said side handle in said inoperative position or in a selected operative position; and a limiting stop engagegble with said side handle for preventing said side handle from pivoting more than said angle of 90°.

5. The wheeled vehicle of claim 1 in which said vehicle frame includes a U-shaped crossbar extending from one side of said vehicle frame to the other side of said vehicle frame, said crossbar being located at the front of and above said child support member in a position to keep a child sitting on the seat from falling from said child support member, said U-shaped crossbar having side legs attached to said vehicle frame.

6. The wheeled vehicle of claim 1 including a collapsible tray table, said tray table comprising:
(a) an inverted "U"-shaped frame that having a top crossbar and two support legs extending downward from said top crossbar;
(b) a sheet of flexible material having a first end secured to said top crossbar and a second end secured to the back of said vehicle frame; and
(c) an extension rod having an inner end portion pivotally connected to said vehicle frame, said extension rod having an open position and an out-of-the way closed position;
said tray table being movable from (i) a collapsed, inoperative position adjacent the back of the vehicle in which inoperative position said sheet of flexible material is draped down to fold upon itself, into (ii) an extended, operative position in which said tray table support legs are spaced from the back of the vehicle by said pivotable extension rod in its open position and the sheet of flexible material is stretched out to form a relatively taut, generally horizontal surface.

7. The wheeled vehicle of claim 6 which includes at least one catch to releasably hold the support legs of the collapsed tray table in a closed position in which the bottom ends of the tray table support legs are located at a level spaced above the bottom surfaces of the wheels of the baby stroller.

8. The wheeled vehicle of claim 6 which includes a side handle support frame having an inner end portion pivotally attached to the rear portion of said vehicle frame to permit said side handle support frame to be pivoted against the side of said vehicle frame when said side handle is in its operative position, and an outer end potion pivotally attached to the inner end portion of said side handle to permit pivoting of said side handle to its operative position with respect to said side handle support frame, and said side handle support frame carrying a limiting stop at the outer end of said support frame for limiting the pivoting of said side handle to a selected maximum angle, and said side handle support frame also carrying locking fingers releasably engagable with one of the tray table support legs to position the side handle support frame to hold the support leg spaced from the back of the wheeled vehicle.

9. The wheeled vehicle of claim 8 in which the length of the side handle support frame is adjustable to permit selective positioning of the pivot point for the side handle,
whereby the laterally extending side handle can be positioned at any of a plurality of predetermined locations from the back to the front of the wheeled vehicle, said side handle support frame being adjustable to the desired length for holding the tray table support legs spaced from the back of the vehicle.

10. The wheeled vehicle of claim 1 which is a baby buggy in which the child support member has the general form of a large basket.

11. The wheeled vehicle of claim 1 in which said vehicle frame includes support legs pivotally connected to each other and movable relative to each other between an operative position supporting said child support member and a collapsed position in which the child support member, vehicle frame, support legs, wheels and side handle are all folded compactly into a space that has a front-to-back dimension that is less than about one-half the front-to-back dimension of the wheeled vehicle in its operative, position.

12. The wheeled vehicle of claim 1 in which said side handle includes an inner end pivotally attached to said one side of said vehicle frame.

13. The wheeled vehicle of claim 1 including:
(a) a side handle support frame having an inner end portion and an outer end portion, said inner end portion being pivotally attached to the rear portion of the vehicle frame to permit said support frame to be pivoted forward against said one side of the vehicle frame when said side handle is in its operative position; and
(b) said side handle has an inner end portion pivotally attached to said outer end portion of the support frame to permit pivoting of said the side handle into said inoperative position adjacent to the support frame.

14. The wheeled vehicle of claim 13 in which said vehicle frame includes a U-shaped crossbar extending from one side of said vehicle frame to the other side of said vehicle frame, said U-shaped crossbar having side legs attached to said vehicle frame, and said side handle support frame carries locking fingers positioned to grasp one of said side legs of said U-shaped crossbar to secure said support frame when it is pivoted forward against said one side of the vehicle frame to provide support for said side handle in its operative position.

15. The wheeled vehicle of claim 13 which the dimensions of the available space within the side handle support frame are greater than the respective over-all outer dimensions of the side handle, whereby the side handle can be folded back upon the support frame and nested within the support frame.

16. The wheeled vehicle of claim 15 in which the side handle support frame carries a catch positioned to hold the side handle nested within the support frame.

17. The wheeled vehicle of claim 13 in which the length of the side handle support frame is selectively adjustable to position the side handle, when in its operative position, in any of several predetermined locations along said one side of said vehicle frame.

18. The wheeled vehicle of claim 13 in which the inner end of the side handle support frame is pivotally attached to the rearwardmost portion of the side of the stroller, whereby the folded-together side handle and side handle support frame can be swung around into an out-of-the-way position behind the rear of the stroller.

19. The baby buggy of claim 10 in which the side handle in its inoperative position extends alongside the buggy and closely adjacent the side of the buggy.

20. A baby stroller which comprises:

(a) a seat;

(b) a back support;

(c) a vehicle frame supporting the seat and back support, the bottom portion of the frame having four corners;

(d) four wheels, each of which is pivotally attached to the bottom portion of the vehicle frame near one corner of the frame to permit the baby stroller to roll when pushed;

(e) a side handle pivotally connected to the vehicle frame, the side handle being laterally pivotable from an inoperative position at one side of the stroller to a laterally extending, operative position that is fixed with respect to the stroller against a push applied to the side handle in the forward direction;

(f) a side handle support frame the inner end portion of which is pivotally attached to the rear portion of the vehicle frame, with the side handle being pivotally attached to the side handle support frame at the outer end of the side handle support frame, and the side handle being foldable together with the side handle support frame, to permit the folded-together side handle and side handle support frame to be selectively (i) positioned closely adjacent the side of the stroller or (ii) swung around into an out-of-the-way position behind the stroller, the length of the side handle support frame being selectively adjustable to position the side handle, when in its laterally extended, operative position in any of several predetermined front-to-back locations with respect to the stroller; and (g) a collapsible tray table that comprises:

(i) an inverted "U"-shaped frame having a top crossbar and two support legs extending downward from the top crossbar;

(ii) a sheet of flexible material secured to the top crossbar at one end of the sheet and secured to the back of the vehicle frame at the other end of the sheet, the tray table being movable from a collapsed, inoperative position adjacent the back of the baby stroller, with the sheet of flexible material draped down to fold upon itself, into an extended, relatively taut, generally horizontal, operative position in which the pivotable side handle support frame engages one of the tray table support legs to hold the legs spaced from the back of the stroller, whereby a person operating the stroller can push it by grasping the side handle from a position alongside the stroller, from which position the person can observe the baby, the surrounding foot and automobile traffic and obstacles such as curbs and potholes as the stroller is pushed along; and the tray table can be placed in its extended, operative position to support a baby while the baby's clothing or diaper is being changed, and when the tray table is not being so used it can be collapsed into an out-of-the-way position behind the stroller.

* * * * *